(12) United States Patent
Yang

(10) Patent No.: US 11,306,456 B2
(45) Date of Patent: Apr. 19, 2022

(54) HELICAL PILE AND BRACKET MODULE COMPRISING THE SAME

(71) Applicant: TARGET ELECTRIC CO., LTD., Taipei (TW)

(72) Inventor: Jen Te Yang, Taipei (TW)

(73) Assignee: TARGET ELECTRIC CO., LTD., Taipei (TW)

(*) Notice: Subject to any disclaimer, the term of this patent is extended or adjusted under 35 U.S.C. 154(b) by 0 days.

(21) Appl. No.: 17/206,606

(22) Filed: Mar. 19, 2021

(65) Prior Publication Data

US 2021/0310209 A1 Oct. 7, 2021

(51) Int. Cl.
*E02D 5/22* (2006.01)
*F24S 25/617* (2018.01)

(52) U.S. Cl.
CPC ............ *E02D 5/223* (2013.01); *F24S 25/617* (2018.05)

(58) Field of Classification Search
CPC combination set(s) only.
See application file for complete search history.

(56) References Cited

U.S. PATENT DOCUMENTS

| | | | |
|---|---|---|---|
| 7,241,079 B2* | 7/2007 | Francis | E02D 5/56 248/530 |
| D612,954 S * | 3/2010 | Perko | D25/122 |
| 10,392,768 B2* | 8/2019 | Kemp | E02D 5/56 |
| 10,822,761 B1* | 11/2020 | Voyen | E04G 25/04 |
| 2007/0000187 A1* | 1/2007 | St. Onge | E02D 5/74 52/157 |
| 2008/0241399 A1* | 10/2008 | Wilkins | E02D 5/14 428/416 |
| 2014/0227041 A1* | 8/2014 | Stroyer | E02D 5/80 405/252.1 |
| 2015/0108148 A1* | 4/2015 | Lyublinski | C23F 11/02 137/376 |

(Continued)

FOREIGN PATENT DOCUMENTS

| | | |
|---|---|---|
| CN | 207891882 U | 9/2018 |
| TW | M552580 | 12/2017 |

OTHER PUBLICATIONS

Taiwan Intellectual Property Office, First Office Action for corresponding Taiwanese Application No. 109111226, dated Jul. 10, 2020, 5 pages.

(Continued)

*Primary Examiner* — Kyle Armstrong
(74) *Attorney, Agent, or Firm* — Loeb & Loeb LLP

(57) ABSTRACT

Provided are a helical pile and a bracket module comprising the same. The helical pile includes a column body, at least a helical blade and a loading member. The column body has a fixing end, a loading end opposite to the fixing end, and a body section between the fixing end and the loading end. The helical blade is disposed on the column body between the fixing end and the loading end. The loading member is connected to the loading end of the column body and includes a flange. The ratio of the body diameter of the column body to the blade diameter of the helical blade ranges from 1:3 to 1:7. The helical pile features excellent compression bearing capacity and uplift bearing capacity due to its specific element-size ratio, and is applicable for installation in areas subject to harsh conditions or with peculiar geological features or soil conditions.

9 Claims, 14 Drawing Sheets

(56) References Cited

U.S. PATENT DOCUMENTS

2016/0186403 A1\* 6/2016 Tomchesson ........... E02D 5/526
                                                              405/244
2018/0148901 A1\* 5/2018 Kemp .................... E02D 5/223

OTHER PUBLICATIONS

Taiwan Intellectual Property Office, Second Office Action for corresponding Taiwanese Application No. 109111226, dated Aug. 31, 2020, 3 pages.

\* cited by examiner

HELICAL PILE AND BRACKET MODULE COMPRISING THE SAME

CROSS-REFERENCE TO RELATED PATENT APPLICATION

This application claims the benefit under 35 U.S.C. § 119 of Taiwan Patent Application Ser. No. 109111226 filed on Apr. 1, 2020, which is incorporated herein by reference in its entirety.

Some references, which may include patents, patent applications, known arts, and various publications, may be cited and discussed in the description of this disclosure. The citation and/or discussion of such references is provided merely to clarify the description of the present disclosure and this provision should not be construed to mean that any such references are "prior arts" to the disclosure described herein. All references cited and discussed in this specification are incorporated herein by reference in their entirety and to the same extent as if each reference was individually incorporated by reference.

FIELD OF THE DISCLOSURE

The present disclosure relates to a helical pile and a bracket module comprising the same, and more particularly to a helical pile and a bracket comprising the same for solar equipment.

BACKGROUND

With the rapid development of the green energy industry, solar-related equipment has become one of the major research and development goals in the energy development-related field. In general, solar cell panels for solar equipment may be installed on the roofs of buildings or on the ground for being irradiated by sunlight. However, in that the structural strength and the installation efficiency of the brackets for solar cell panels to be mounted on the ground greatly depends on the geologic nature of the ground, there is a need to develop and provide suitable solar cell bracket modules for various kinds of terrain or soil.

Traditionally, in order to enable the installed solar cell panels to withstand severe weather and natural disasters, such as strong winds, typhoons, geological activities and earthquake, etc., an additional foundation was provided. In particular, it is common to erect support columns on concrete in advance to fasten the brackets for the solar cell panels thereon. However, providing such foundations requires ground excavation and pouring cement, processes that entail additional construction and material costs. In addition, the installation process for such foundations is complicated and does harm to the environment.

In response to the above problems, the existing art uses piles to provide a supporting structure for the solar cell panels. Compared to the time-consuming and costly process of providing cement foundations, piles may be pressed or otherwise installed into the ground relatively quickly to accommodate the brackets of the solar cell panels, thereby significantly reducing the construction cost. Using helical piles as additional foundations is a solution widely adopted in recent years. In general, a helical pile is a steel tube with helical blades and having a tube length from 0.55 to 2.7 meters and a diameter from 60 to 219 millimeters. The upper portion of the helical pile is exposed above the ground, and the height of the bracket above the ground may be adjusted according to varied terrain. Fixing members, such as screws, may be used to connect the pile with other supporting structures attached to the solar cell panels. During the construction process, the helical piles may be installed in the ground by using electric pile drivers or helical pile drivers.

Reference is made to FIG. 1, wherein FIG. 1 is an orthographic side view of a pile-type supporting structure for the solar cell panels of the existing art. As shown in FIG. 1, the pile-type supporting structure for the solar cell panels may be a helical pile P' having a column body 1' and a helical blade 2' disposed on the column body 1'. In other words, the helical pile P' of the existing art shown in FIG. 1 has a structure quite similar to that of a typical screw.

However, the inventors of the present disclosure have discovered that the helical pile P' of the existing art shown in FIG. 1 is only suitable for sites at which the soil is dense and stable, or at which the hardness of the ground is relatively high.

Specifically, when the helical pile P' is pressed or screwed into the ground, it is difficult to control the plumbness (verticality) of the helical pile P' with respect to level ground. In addition, a plurality of helical piles P' carrying the same solar cell panel will require accurate adjustment of their heights (i.e., to have either uniform heights or to have varied heights with predetermined differences thereof).

Moreover, in addition to providing sufficient support (load bearing) for the solar cell panels, the helical pile P' is generally required to be wind-resistant, i.e., to have an excellent uplift-resistant coefficient (also referred to as an uplift bearing capacity). However, the helical piles P' of the existing art do not feature uplift-resistant coefficient sufficient for areas with certain soil conditions, such as those with softer soils in which displacement may easily occur, for example, an intertidal zone or a rocky beach area. Moreover, the bearing capacity of the helical piles carrying a solar cell panel should be taken into consideration while selecting applicable pile structures. In other words, the helical piles are required to have appropriate compression bearing capacity. Moreover, regarding the brackets for the solar cell panels installed at coastal sites, a higher maintenance frequency and larger reinforcing strength are required to sustain the usability of the brackets in response to the influence by the coastal surroundings, ocean currents and humid weather. Specifically, in various areas around South-East Asia, the regular monsoons from the Indian Ocean result in an environment with high temperatures, high humidity and high salinity, along with high irradiance from the tropical sun, making such areas among the worst in the world in terms of corrosion. In addition, the environment along the coast may suffer from high lateral pressures, high acid-base concentrations and high thermal stress, as well as high erosion and abrasion due to the natural surroundings. Therefore, the brackets for the solar cell panels installed in these areas are further required to exhibit excellent anti-corrosion properties.

In summary, in the technical field of pile structures for solar equipment, there is a need to provide helical piles for solar equipment having sufficient uplift bearing capacity and compression bearing capacity, low-cost and excellent anti-corrosion properties for use upon certain geologic terrains and in harsh environmental conditions.

SUMMARY

In response to the above-referenced technical inadequacies, the present disclosure provides a helical pile and a bracket module comprising the same. The helical pile is specially-designed with a specific element-size ratio, thereby being able to feature both the uplift bearing capacity and the compression bearing capacity required by a helical pile for use upon certain geologic terrains and in harsh environmental conditions.

In one aspect, the present disclosure provides a helical pile including a column body, at least a helical blade and a loading member. The column body has a fixing end, a loading end opposite to the fixing end, and a body section between the fixing end and the loading end. The helical blade is disposed on the column body between the fixing end and the loading end. The loading member is connected to the loading end of the column body and includes a flange. The ratio of the body diameter of the column body to the blade diameter of the helical blade ranges from 1:3 to 1:7.

In a preferable embodiment, the helical blade divides the body section from the loading end to the fixing end into a first section and a second section, and the ratio of the length of the first section to the length of the second section ranges from 6:1 to 2:1

In a preferable embodiment, the helical pile includes two helical blades which divide the body section from the loading end to the fixing end into a first section, a second section and a third section, wherein the first section has a length from 1000 to 2000 mm, the second section has a length from 4500 to 5300 mm, and the third section has a length from 50 to 150 mm.

In a preferable embodiment, the helical pile includes three helical blades which divide the body section from the lading end to the fixing end into a first section, a second section, a third section and a fourth section, wherein the first section has a length from 1000 to 2000 mm, the second section has a length from 2000 to 3000 mm, the third section has a length from 2000 to 3000 mm, and the fourth section has a length from 50 to 150 mm.

In a preferable embodiment, the flange has a diameter from 100 to 300 mm and a thickness from 5 to 10 mm, and the flange has a plurality of openings.

In a preferable embodiment, the loading member further includes a plurality of reinforcing ribs each having two side surfaces with a certain geometrical shape and spaced apart from each other 3 to 10 mm; the plurality of reinforcing ribs each being attached to a lower surface of the flange and a body surface of the column body.

In a preferable embodiment, the helical blade has a diameter from 200 to 500 mm, and the helical blade has a helical structure that surrounds the column body for 1 to 2 turns In a preferable embodiment, the helical structure has a spacing from 50 to 200 mm along the axial direction of the column body.

In a preferable embodiment, the helical pile further includes a multi-functional coating covering a surface of the column body and the at least one helical blade. The multi-functional coating includes an epoxy coating, a zinc-containing coating or a combination thereof, and the epoxy coating has a thickness from 50 to 250 μm and the zinc-containing layer has a thickness from 50 to 350 μm.

Another aspect of the present disclosure provides a bracket module including a helical pile as described above and a connecting frame. The connecting frame is connected to the helical pile through the flange at the loading end, and the connecting frame is configured to mount a solar cell panel thereon.

One of the major technical features of the present disclosure is that the helical piles and the bracket module comprising the same provided herein may be used in locations with peculiar geologic terrain, by way of the unique design of the ratio between different members or sections in the structure, such as "the ratio of the body diameter of the column body to the blade diameter of the helical blade ranging from 1:3 to 1:7", and the incorporation of a multi-functional coating.

BRIEF DESCRIPTION OF THE DRAWINGS

The present disclosure will become more fully understood from the following detailed description and accompanying drawings.

DETAILED DESCRIPTION

Figure 1:
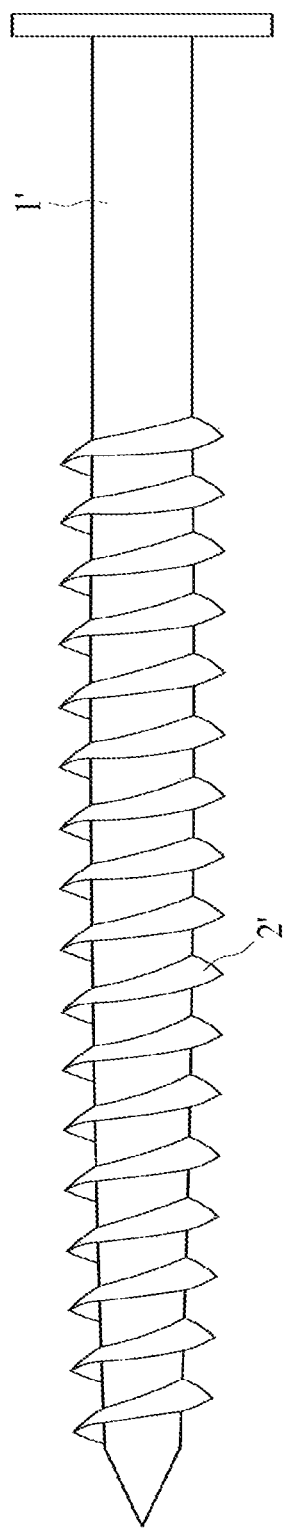
FIG. 1 is an orthographic side view of a helical pile according to the existing art.

The present disclosure is described in more detail through the following examples that are intended to be illustrative only because numerous modifications and variations thereto will be apparent to those skilled in the art. Identical or similar numerals in the drawings indicate identical or similar components throughout the views. As used in the description herein and throughout the claims that follow, unless the context clearly dictates otherwise, the meaning of "a", "an", and "the" includes plural reference, and the meaning of "in" includes "in" and "on". Titles or subtitles are used herein for the convenience of the reader, which shall not affect the scope of the present disclosure.

The terms used herein generally have their ordinary meanings in the art. In the case of conflict, the present document, including any definitions given herein, will prevail. The same item can be expressed in more than one way. Alternative language and synonyms can be adopted for any term(s) discussed herein, and no specific significance is to be given to whether a term is elaborated on or discussed herein. A recital of one or more synonyms does not exclude the use of other synonyms. The use of examples anywhere in this specification, including examples of any terms, is illustrative only, and in no way limits the scope and meaning of the present disclosure or of any exemplified term. Likewise, the present disclosure is not limited to the various embodiments provided herein. Cardinal numbering terms such as "first", "second" or "third" can be used to describe various components or the like, which are for distinguishing one component from another only, and are not intended to, nor should they be construed to impose any substantive limitations on the components or the like.

Figure 2:
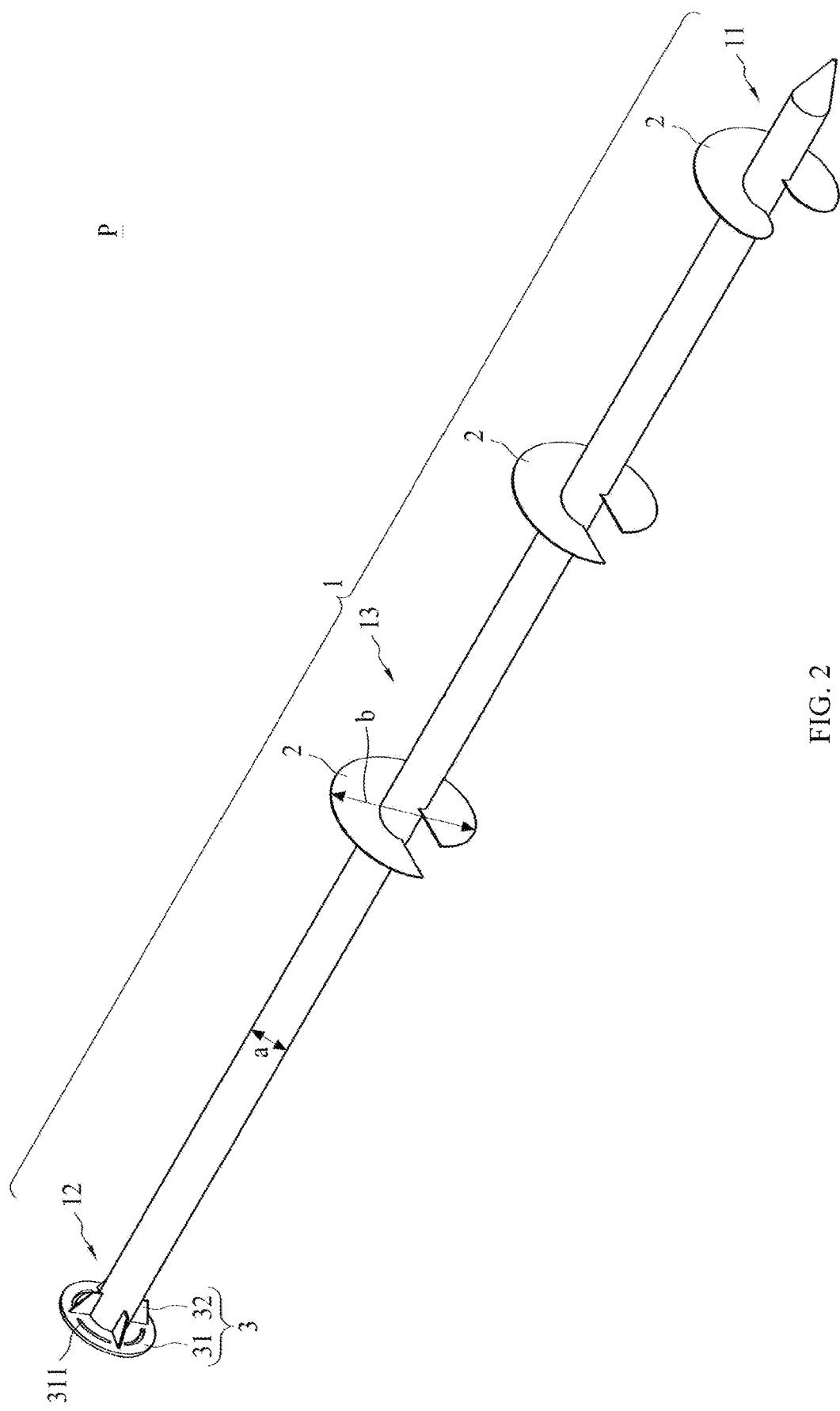
FIG. 2 is a perspective view illustrating a helical pile according to an embodiment of the present disclosure.

Reference is made to FIG. 2, wherein FIG. 2 is a perspective view of a helical pile P according to one of the embodiments of the present disclosure. The helical pile P provided by the embodiment of the present disclosure includes a column body 1, at least a helical blade 2 and a loading member 3. As shown in the figure, the column body 1 has a fixing end 11, a loading end 12 opposite to the fixing end 11, and a body section 13 located between the fixing end 11 and the loading end 12. The helical blade 2 is disposed on the column body 1 between the fixing end 11 and the loading end 12. The loading member 3 is connected to the loading end 12 of the column body 1 and includes a flange 31. In the embodiment shown in FIG. 2, the helical pile P includes three helical blades 2. However, in other possible embodiments of the present disclosure, the number of helical blades 2 included in the helical pile P is not restricted. In the following embodiments, the helical pile P may include one, two, three or four helical blades 2.

Referring again to FIG. 2, the ratio of the body diameter a of the column body 1 to the blade diameter b of the helical blade 2 is from 1:3 to 1:7. It should be noted that as shown in FIG. 2, the fixing end 11 of the column body 1 of the helical pile P may have a cone shape, i.e., the diameter of the column body 1 becomes progressively smaller while moving along the column body 1 towards the end of the fixing end 11 of the column body 1, thereby resulting in the end of the fixing end 11 being shaped as a pointed tip. Therefore, the body diameter a mentioned above refers to the diameter of the section of the column body 1 having uniform diameter. Generally speaking, the body diameter a may be the diameter of the body section 13 of the column body 1. In the embodiments of the present disclosure, the body diameter a may range from 25.4 to 200 millimeters (mm) For example, in the embodiments of the present disclosure, the body diameter a may be 25.4 mm, 76.4 mm, 95 mm, 114 mm or 140 mm. In the embodiments of the present disclosure, the column body 1 of the helical pile P may be a stainless-steel tube. The wall thickness of the column body 1 is at least 4 millimeters. In addition, the cone-shaped fixing end 11 may have a cone angle from 30 to 60 degrees. However, the current disclosure is not limited thereto.

It should be noted that the fixing end 11 of the column body 1 of the helical pile P does not necessarily need to have a progressively smaller diameter. Alternatively, the fixing end 11 of the column body 1 of the helical pile P may have a bevel cut, thereby allowing the helical pile P to be easily screwed or inserted into the ground during the installation process. The beveled surface may have a tilt angle of from 30 to 60 degrees with respect to the axis of the column body 1.

When the helical pile P of the embodiments of the present disclosure includes two or more helical blades 2, these helical blades 2 may have the same or different blade diameters b. When these helical blades 2 have the same blade diameters b, the ratio of the body diameter a to the blade diameter b may range from 1:3 to 1:7. When these helical blades 2 have different blade diameters b, the ratio of the body diameter a to the blade diameter b of the smallest helical blade 2 may range from 1:3 to 1:7. In other words, in the embodiment of the present disclosure, the helical pile P includes at least a helical blade 2 having a diameter (blade diameter b) that is 3 to 7 times the body diameter a. When these helical blades 2 have different blade diameters b, in addition to the smallest blade diameter b, the other blade diameter(s) b may be 3 to 10 times the body diameter a. Moreover, the ratio of the blade diameter b to the thickness of the helical blade 2 is preferably smaller than 30. When the blade diameter b of the helical blade 2 is larger than or equal to 20 mm, the thickness of the helical blade 2 may be larger than 5 mm, and when the blade diameter b of the helical blade 2 is smaller than 20 mm, the thickness of the helical blade 2 may be larger than 2 mm. In addition, the helical blades 2 and the column body 1 may be connected by a continuous soldering process, and the height of the solder may not be higher than the minimum wall thickness of the component to be soldered, i.e., the helical pile P.

In fact, based on extensive research conducted by the inventors of the present disclosure, when the ratio of the body diameter a of the column body 1 to the blade diameter b of the helical blade 2 ranges from 1:3 to 1:7, the helical pile P exhibits an uplift bearing capacity appropriate for a location having softer soil conditions. Further, when the ratio of the body diameter a of the column body 1 to the blade diameter b of the helical blade 2 is within the above range, the uplift bearing capacity and compression bearing capacity of the helical pile P are suitably balanced.

The compression bearing capacity ($Q_a$) of the helical pile P may be calculated from the following equation 1:

$$Q_a = \frac{Q_S}{F_{S_1}} + \frac{Q_b}{F_{S_2}} = \frac{f_s A_s}{F_{S_1}} + \frac{q_b A_b}{F_{S_2}} \qquad \text{Equation 1}$$

In Equation 1, $Q_s$ refers to the compression bearing capacity on the surface of the helical pile, $Q_b$ refers to the compression bearing capacity of the end of the helical pile, $f_s$ refers to the surface friction force of the helical pile (in $KN/m^2$), $A_s$ refers to the surface area of the helical pile (in $m^2$), $q_b$ refers to the ultimate bearing force of the end of the helical pile (in $KN/m^2$), $A_b$ refers to the cross sectional area of the end of the helical pile ($m^2$), and $FS_1$ and $FS_2$ are the safety coefficients (for example, 3.0).

The uplift bearing capacity ($R_a$) of the helical pile P may be calculated from the following Equation 2:

$$R_a = W_p + \frac{f_s A_s}{FS} \qquad \text{Equation 2}$$

In Equation 2, $f_s$ refers to the surface friction force of the helical pile (in $KN/m^2$), As is the surface area of the helical pile (in $m^2$), $W_p$ is the weight of the helical pile (in KN), and $F_S$ is the safety coefficient (for example, 3.0).

Based on these calculations, the helical pile P provided by the embodiments of the present disclosure features an uplift bearing capacity ($R_a$) of larger than 35 KN and a compression bearing capacity ($Q_a$) of larger than 45 KN. In a preferred embodiment, the helical pile P has an uplift bearing capacity ($R_a$) of larger than 40 KN and a compression bearing capacity ($Q_a$) of larger than 50 KN. Table 1 shows some examples of possible dimensions and the calculated compression bearing capacity of the helical piles P/P'. The bearing capacity of a helical pile P according to one of the embodiments (the nineth embodiment) will be described later.

TABLE 1

Dimensions of helical pile P (mm)

| total length | helical blade (blade diameter/ thickness/distance from the very end of the fixing end) | Column body (column diameter/ thickness/distance from the very end of the bearing end) | Compression bearing capacity (KN) |
|---|---|---|---|
| 3000 | 100/10/2500 | 89/3.5/500 | >230 |
| 2500 | 100/10/2000 | 89/3.5/500 | 183 |
| 2000 | 100/10/1500 | 89/3.5/500 | 54.4 |
| 1500 | 100/10/1000 | 89/3.5/500 | 36.3 |
| 1000 | 80/8.0/700 | 76/3.0/500 | 14.6 |
| 1500 | 80/8.0/1000 | 76/3.0/500 | 24.6 |
| 2000 | 80/8.0/1500 | 76/3.0/500 | 35.3 |
| 2500 | 80/8.0/2000 | 76/3.0/500 | 60.3 |
| 1000 | 80/8.0/1000 | — | 26.3 |
| 1500 | 80/8.0/1500 | — | 31.1 |
| 2000 | 80/8.0/2000 | — | 46.3 |
| 1000 | 100/10/1000 | — | 34.6 |
| 1500 | 100/10/1500 | — | 51.5 |
| 2000 | 100/10/2000 | — | 62.6 |
| 1000 | 60/6.0/700 | 48/3.0/300 | 12.2 |
| 1200 | 60/6.0/900 | 48/3.0/300 | 17.4 |
| 1200 | 60/6.0/1200 | 48/3.0/300 | 21.2 |
| 800 | 50/5.0/500 | 42/3.0/300 | 7.8 |
| 1000 | 50/5.0/700 | 42/3.0/300 | 11.8 |
| 1200 | 50/5.0/900 | 42/3.0/300 | 13.8 |
| 300 | 30/4.0/300 | — | 3.2 |

Regarding the helical pile P of the embodiments of the present disclosure, the helical blade 2 may have a diameter ranging from 200 mm to 500 mm and a helical structure surrounding the column body 1 for 1 to 2 turns. For example, the diameter of the helical blade 2 may be 200 millimeter (mm), 250 mm, 300 mm, 350 mm, 400 mm, 450 mm or 500 mm, and the helical structure of the helical blade 2 may surround the column body 1 for 1 turn, 1 and a quarter (1¼) turns, 1.5 turns, 1 and three quarter (1¾) turns or 2 full turns. In addition, the helical structure of the helical blade 2 has a spacing from 50 to 200 mm along the axial direction of the column body 1. For example, the helical structure of the helical blade 2 has a spacing of 50 mm, 100 mm, 150 mm or 200 mm along the axial direction of the column body 1. It should be noted that, when the helical pile P includes two or more helical blades 2, each helical blade may have different dimensions. The dimensions of the helical blades 2 may be selected according to the requirements of the target application.

Referring still further to FIG. 2, specifically, in the helical pile P provided by the embodiments of the present disclosure, the loading member 3 located at the loading end 12 of the column body 1 is configured to be connected to the other support structures of the solar equipment. For example, the loading end 12 may be connected with a connecting frame, wherein the connecting frame is for mounting the solar cell panel of the solar equipment thereon. The connecting frame may include support structures, such as a tiltable support column and an upright column, etc., and the type and specific structure of the connecting frame is not restricted in the present disclosure. Therefore, in the embodiments of the present disclosure, the loading member 3 may include a flange 31 with a disc-like shape. In the figures of the present disclosure, the flange 31 is depicted with a disc-like shape. However, the present disclosure is not limited thereto, and the flange 31 of the embodiments of the present disclosure may be configured with a rectangular, oval, or polygonal shape, or any other geometric shapes.

In order to steadily connect the helical pile P to the other support structures, such as a connecting frame, the flange 31 may have one or more openings 311 which are configured to connect the helical pile P and the connecting frame through a fixing member, such as a screw. The opening 311 may be a narrow through hole disposed along the edge of the flange 31 having a disc-like shape, whereby the positions of the fixing screws may be selected and adjusted according to the actual needs. In the embodiments of the present disclosure, the disc-like flange 31 has a diameter from 100 mm to 300 mm and a thickness from 5 mm to 10 mm. For example, in the embodiments of the present disclosure, the flange 31 may have a diameter of 180 mm, 200 mm, 220 mm or 250 mm.

In addition, the loading member 3 configured to attach the helical pile P to the other support structures may further include a plurality of reinforcing ribs 32. Each of the reinforcing ribs 32 attaches to both the lower surface of the flange 31 and the body surface of the column body 1. Specifically, the lower surface of the flange 31 refers to the surface of the disc-like flange 31 facing the fixing end 11 of the column body 1. Thereby, the plurality of reinforcing ribs 32 are disposed between the surfaces of the flange 31 and the column body 1. The reinforcing ribs 32 are configured to enhance the bearing capacity of the flange 31.

As shown in FIG. 2, the reinforcing ribs 32 of the embodiments of the present disclosure may have two side surfaces having a geometric shape, such as a trapezoid shape, and the two side surfaces are separated from each other by 3 mm to 10 mm. In other words, each of the reinforcing ribs 32 may be a trapezoid-shaped thin plate, wherein the thickness of the thin plate is from 3 mm to 10 mm. It should be noted that in the embodiments of the present disclosure, the plurality of reinforcing ribs 32 are optionally included in the column body 1. Therefore, the present disclosure is not limited to embodiments that include such reinforcing ribs 32. Further, in the embodiments of the present disclosure, the reinforcing ribs 32 are not necessarily formed with trapezoid-shaped side surfaces, but with side surfaces with other similarly effective geometric shapes, such as triangular shapes.

In the embodiments of the present disclosure, regarding the reinforcing ribs 32 which are formed as trapezoid-shaped thin plates, for example, with respect to the flange 31 having a diameter ranging from 100 mm to 300 mm, the contact length between a reinforcing rib 32 and the body surface of the column body 1 may be from 80 to 120 mm. The long edge of the trapezoid-shape side surface of the reinforcing rib 32 is in contact with the lower surface of the flange 31 and may have a length from 50 to 60 mm. The short edge of the trapezoid-shape side surface of the reinforcing rib 32 may have a length from 30 to 40 mm.

In the embodiments of the present disclosure, the helical pile P may further include a multi-functional coating covering the column body 1 and the helical blade 2. In some embodiments of the present disclosure, the multi-functional coating may further cover the loading member 3. For example, the multi-functional coating may cover the flange 31 and the plurality of reinforcing ribs 32 of the loading member 3. In addition, in the bracket module M comprising the helical pile P provided by the embodiments of the present disclosure, the multi-functional layer may further cover the fixing members (such as screws) connecting the helical pile P to the connecting frame. The multi-functional coating may be an epoxy coating or a zinc-containing coating. Alternatively, the multi-functional layer may be a composite coating comprising an epoxy coating and a zinc-containing coating.

Specifically, the epoxy coating may be formed of a thermoplastic fusion bonded powder coating material using epoxy resin as the main film-forming material, also referred to as "fusion bonded epoxy coating powders". The above material for the epoxy coating is an inorganic coating, and therefore, the problems of cathodic delamination and cathodic blisters related to organic coatings made from organic materials may be avoided. Regarding the disadvantage that the wet adhesion of the inorganic coating may deteriorate, the embodiments of the present disclosure provide the following specific manufacturing processes and materials formulation as possible solutions.

The manufacturing process for applying the epoxy coating, which serves as the multi-functional coating, on the helical pile P may include the steps of performing a surface treatment on the helical pile P, pre-heating the helical pile P, applying the epoxy coating and curing the epoxy coating, etc.

Specifically, within the manufacturing process, the surface of the helical pile P may be subjected to various surface treatments, including sharpening, heating to remove water within tiny gaps and defects and other volatile matter, cleaning to remove contaminants, and so on. Subsequently, the helical pile P may be pre-heated, and the pre-heated temperature may be lower than 275° C. Next, an electrostatic spraying process, a friction electrostatic spraying process, a fluidized bed process, an electrostatic fluidized bed process, etc. may be used to apply the coating. Lastly, the coating may be cured under the pre-heated temperature, or by a further heated temperature. In the embodiments of the present disclosure, the epoxy coating may have a thickness ranging from 50 to 250 μm.

In addition, the epoxy powder coating material for forming the epoxy coating described above may have a density from 1.3 to 1.6 g/cm$^3$ (for example, as measured by the China GB/T 4472 Standard) and a volatile content of 0.6% or less (for example, as measured by the China GB/T 6554 Standard). Further, the particle size distribution of the epoxy powder coating material may have the following properties: 3% or less of which has a particle size of larger than 150 μm, and 0.2% or less of which has a particle size of larger than 250 μm (for example, as measured by the China GB/T 6554 Standard). Furthermore, the epoxy powder coating material may have a magnetic substance content of 0.002% or less (as measured by the China GB/T 6570 Standard).

When the epoxy coating is formed by fusion bonded epoxy coating powders, the epoxy coating may have an impact resistance of 3 J or larger under −30° C., an abrasion resistance of 100 mg or less (as measured by the China GB/T 1768 Standard), and a binding strength of 60 MPa or more (as measured by the China GB/T 6329 Standard). In addition, the epoxy coating may have a cathodic delamination/disbondment of 6.5 mm or less (at 65° C., 24 hours or 48 hours, as measured by the China SY/T 3042 Standard), an electrical breakdown stress of 30 MV/m or larger (as measured by the China GB/T 141 Standard), and a volume resistivity of $1\times10^{13}$ Ω·m or more (as measured by the China GB/T 1410 Standard).

In fact, in the embodiments of the present disclosure, the method for manufacturing the epoxy coating is not limited to the process described above. In the embodiments of the present disclosure, a high-performance fusion binding epoxy coating technique or a high-performance non-solvent liquid epoxy coating technique (SEBF/SLF high corrosion resistance technique) may be used to form the epoxy coating. The epoxy coating formed by the high-performance fusion binding epoxy coating technique or the high-performance non-solvent liquid epoxy coating technique may have the advantages of achieving high binding strength, high impact resistance, high bending resistance and excellent medium permeation resistance, etc. Preferably, the epoxy coating formed by the above techniques may have a thickness ranging from 100 to 250 μm. Nevertheless, in some embodiments, the epoxy coating may have a thickness larger than 250 μm. For example, regarding the structures applicable for use in highly corrosive environments, the coating may have a thickness larger than 300 μm, 600 μm or 1000 μm. In addition, the epoxy coating may be formed of two layers of epoxy coatings, one on top of the other. When using a double-layered epoxy coating as the multi-functional coating, the inner layer (which is closer to the helical pile P) of the epoxy coatings may have a thickness of 250 μm or larger, and the outer layer of the epoxy coatings may have a thickness of 350 μm or larger.

Specifically, the epoxy coating formed by the high-performance fusion binding epoxy coating technique or the high-performance non-solvent liquid epoxy coating technique is a multi-layered composite structure which may include a surface sub-layer, an intermediate sub-layer and a bottom sub-layer. The surface sub-layer provides the functions of anti-aging, anti-wear and marine substances-resistance; the intermediate sub-layer provides the function of anti-water permeability; and the bottom sub-layer provides a high bonding strength between the composite structure and the helical pile P. Even so, the above-mentioned sub-layers may be formed during a single coating process, and such a composite structure may achieve an anti-corrosion effect good for at least 30 years without combining with other coatings, such as a hot-dip galvanizing coating. In other words, compared to a conventional composite anti-corrosion technique that uses a combination of a primer and a finish coating, the SEBF/SLF high anti-corrosion technique may provide a single coating that may serve as both the primer and the finish coating.

In the embodiments of the present disclosure, non-solvent liquid epoxy coating may have the properties shown in Table 2 below. In addition, the physical properties of the epoxy coating according to the embodiments of the present disclosure may refer to the measurement standards and measured results listed for the fusion binding epoxy powder coating material by the China Standard GB/T18593-2010, for the non-solvent liquid epoxy coating material by the China Standard GB/T 31361-2015, and for the fusion binding epoxy powder coating technique for steel tubes by the China Standard SY/T 0315-2013.

TABLE 2

| No. | Item | Unit | properties of the epoxy coating | measurement method |
|---|---|---|---|---|
| 1 | Appearance | — | uniform color and luster, flat surface, no bubbles, no crackles | visual observation |
| 2 | Impact resistance (−30° C.) | J | ≥3 | SY/T 0315 |
| 3 | Adhesion (75° C. · 7 d) | degree(s) | 1~2 | SY/T 0315 |
| 4 | Cathodic delamination (−1.5 V, 65° C. ± | Mm | ≤6 | SY/T 0315 |

TABLE 2-continued

| No. | Item | Unit | properties of the epoxy coating | measurement method |
|-----|------|------|-------------------------------|--------------------|
|     | 2° C., 2 days) | | | |
| 5 | Bending resistance (23° C.) | — | 1.5°PD, no peeling, no damage | SY/T 0315 |
| 6 | Binding strength | MPa | ≥25, or preferably ≥65 | GB/T 18593-2010 |
| 7 | Abrasion resistance (Cs10 cycles, 1 kg, 1000 r) | mg | ≤100 | GB/T 1768-2006 |
| 8 | Hardness | H | ≥2 | GB/T 6739 |
| 9 | Electrical breakdown stress | MV/m | ≥30 | GB/T 1408.1 |
| 10 | volume resistivity | $\Omega \cdot m$ | $\geq 1 \times 10^{13}$ | GB/T 1410-2006 |
| 11 | salt mist resistance (1000 h) | degrees | ≤1 | GB/T 1771 |
| 12 | weighting percentage of moisture absorption (distillation water, 60° C. ± 2° C., 15 days) | % | ≤2 | GB/T 18593-2010 |
|    | weighting percentage of moisture absorption (3.5% NaCl 60° C. ± 2° C., 15 days) | % | ≤1.5 | GB/T 18593-2010 |
| 13 | chlorides permeability (23° C. ± 2° C., 45 days) | mol/L | $\leq 1 \times 10^{-4}$ | ISO 14655/ GB/T 25826 |

Alternatively, a zinc-containing coating that serves as a multi-functional coating may be a hot-dip galvanizing coating. In the embodiments of the present disclosure, the hot-dip galvanizing coating may have a thickness from 50 to 350 μm. Preferably, the hot-dip galvanizing coating may have a thickness from 100 to 350 μm.

In the preferable embodiments of the present disclosure, the multi-functional coating is a composite coating including both an epoxy coating and a zinc-containing coating, and the composite coating may include the combination of the epoxy coating and the zinc-containing coating described above. Alternatively, the multi-functional layer may be a composite coating formed by a VCI (Volatile corrosion inhibitor) Superimposed Zinc technique. In other words, the composite coating may be achieved by the VCI Superimposed Zinc technique. Specifically, the multi-functional coating may be formed by the following process: filling and attaching the volatile slow-release molecules into the surface structure of the metal material (the helical pile P) through VCI, and applying a zinc-containing coating thereon. The zinc-containing coating may include scaly zinc powder. To be specific, the zinc-containing coating may be formed by grinding spherical zinc particles into sheet-form zinc powder and mixing the zinc powder with additives. As a result, compared to the process by using spherical zinc particles directly to form the coating, the scaly zinc powder may cover the surface of the VCI layer in a more compact and denser manner. Lastly, the hot-dip galvanizing coating may further include an aluminum coating disposed on the zinc-containing layer. The hot-dip galvanizing coating formed by the process mentioned above may provide a sealing film which protects the surface of the metal material (the helical pile P) from corrosion. In other words, the hot-dip galvanizing coating may be used as a high-performance physical shielding layer. In addition, because the resistivity of the zinc material (the zinc powder) is low, the zinc-containing layer formed therefrom may provide strong electrical-chemical protection for the structure underneath. Further, the resulting multi-functional coating has stable properties under normal temperature and pressure, and therefore is beneficial to the maintenance requirements of the equipment. In the embodiments of the present disclosure, the composite coating may have a thickness ranging from 100 to 600 μm. In a preferred embodiment, the composite coating may have a thickness of about 400 μm, in which the thickness of the epoxy coating may be about 50 μm, and the thickness of the zinc-containing coating may be about 400 μm.

Compared to the hot-dip galvanizing coating (using a single zinc-containing coating), the VCI Superimposed Zinc technique may provide a salt-mist resistance from 1000 to 1500 hours, or even a salt-mist resistance of approximately 2000 hours (as measured when the thickness is 30 μm; by comparison, the hot-dip galvanizing coating has a salt-mist resistance of 300 to 400 hours, as measured when the thickness is 65 μm), and has a smooth and aesthetically-pleasing appearance. Although dust may be generated during the manufacturing process, unlike the waste acids, gray water and gases that might be output by a hot-dip galvanizing process, the dust may be simply recovered by filtering equipment. In addition, regarding the weather resistance capacity, the hot-dip galvanizing coating will turn gray after aging, while the appearance of the VCI Superimposed Zinc coating barely changes after five years. Therefore, in the embodiments of the present disclosure, it is preferable to use VCI Superimposed Zinc technique to form the multi-functional coating.

It should be noted that in the embodiments of the present disclosure, the fixing members, for example, the screws for securing and fixing the helical pile P on the other supporting structures may be made from stainless steel. And when dissimilar metals come into direct contact with each other, a voltage difference can exist between them that hastens corrosion. But the multi-functional coating of the fixing members prevents such direct contact between the fixing members and the helical pile P or the connecting frame, which reduces corrosion.

Next, the helical pile P provided by the embodiments of the present disclosure will be described in detail by the following specific embodiments. The content already disclosed in the above description will not be reiterated in the following embodiments.

First Embodiment

Figure 3:
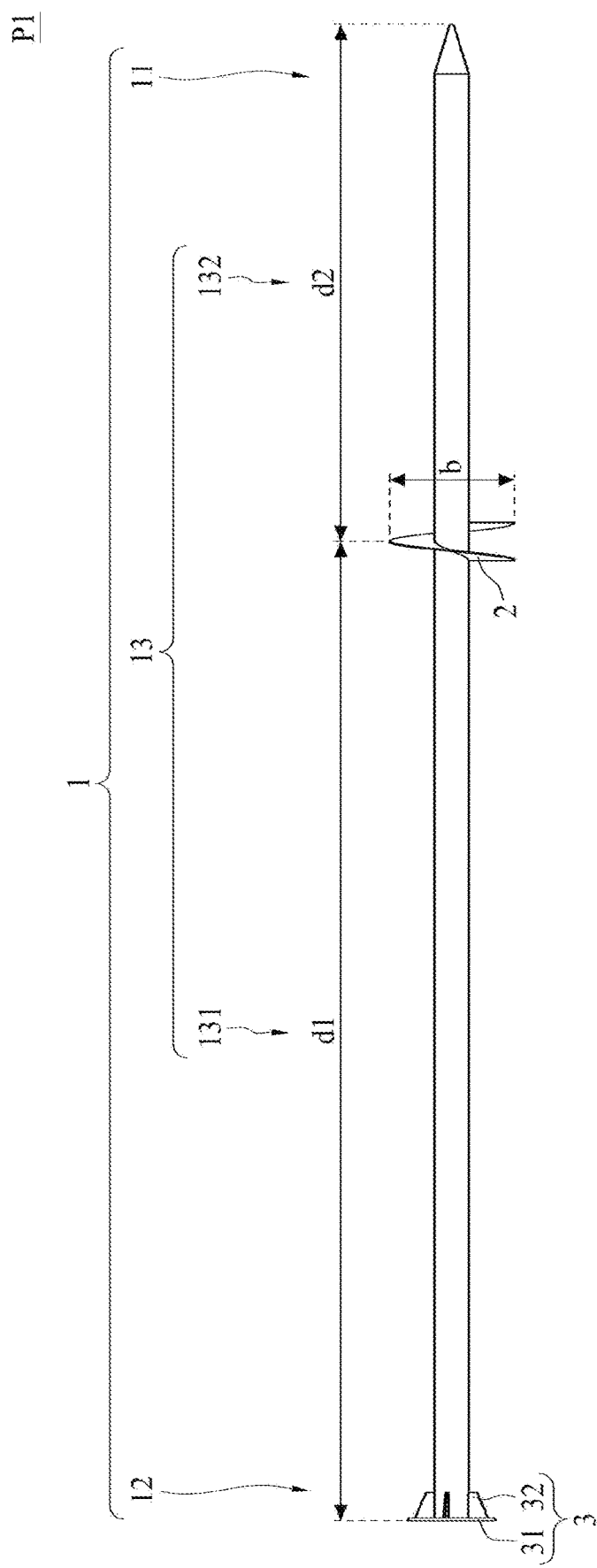
FIG. 3 is an orthographic side view of a helical pile according to a first embodiment of the present disclosure.

Reference is made to FIG. 3. FIG. 3 is an orthographic side view of the helical pile P1 according to a first embodiment of the present disclosure. The helical pile P1 of the first embodiment includes a column body 1, a helical blade 2 and a loading member 3. As shown in the figure, the column body 1 has a fixing end 11, a loading end 12 opposite to the fixing end 11, and a body section 13 located between the fixing end 11 and the loading end 12. The helical blade 2 is disposed between the fixing end 11 and the loading end 12 of the column body 1. The loading member 3 is connected to the loading end 12 of the column body 1 and includes a flange 31 and a plurality of reinforcing ribs 32.

As shown in FIG. 3, the helical blade 2 divides the body section 13 into a first section 131 and a second section 132 between the loading end 12 and the fixing end 11, and the ratio of the length of the first section 131 to that of the second section 132 is preferably from 6:1 to 2:1. Specifically, the length d1 of the first section 131 is the distance from the loading end 12 to the helical blade 2, and the length d2 of the second section 132 is the distance from the helical blade 2 to the fixing end 11. In the first embodiment of the present disclosure, the helical blade 2 is located closer to the fixing end 11 in the body section 13.

As mentioned above, the fixing end 11 of the column body 1 of the helical pile P may be cone-shaped, i.e., the terminal portion of the fixing end 11 of the column body 1 has a diameter that gradually tapers, and thereby results in the very end of the fixing end 11 being the tip of a cone. In the embodiments of the present disclosure, the helical blade 2 may be disposed at a location that is directly adjacent to the location where the diameter of the column body 1 starts to taper. In other words, the diameter of the column body 1 may start to gradually taper from the location where the helical blade 2 is located while moving axially away from the loading end 12. As a result, the helical blade 2 may provide excellent structural stability for the entire helical pile P1. Further, when installing the helical pile P1 into the ground, the cone-shaped fixing end 11 may facilitate easier insertion of the helical pile P1 into the ground, and the structural configuration of the helical blade 2 may subsequently provide a strong supporting effect throughout the procedure of installing the helical pile P1 into the ground. Moreover, the helical blade 2 disposed adjacent to the fixing end 11 may provide enhanced control of the angle of the helical pile P1 with respect to the ground, and the depth of the helical pile P1 under the ground may also be controlled more accurately. Thereby, the heights of the helical piles P1 above the ground and the other supporting structures connected thereto may be more easily adjusted.

In the first embodiment of the present disclosure, the diameter of the helical blade 2 of the helical pile P1 is preferably 45 mm.

Second Embodiment

Figure 4:
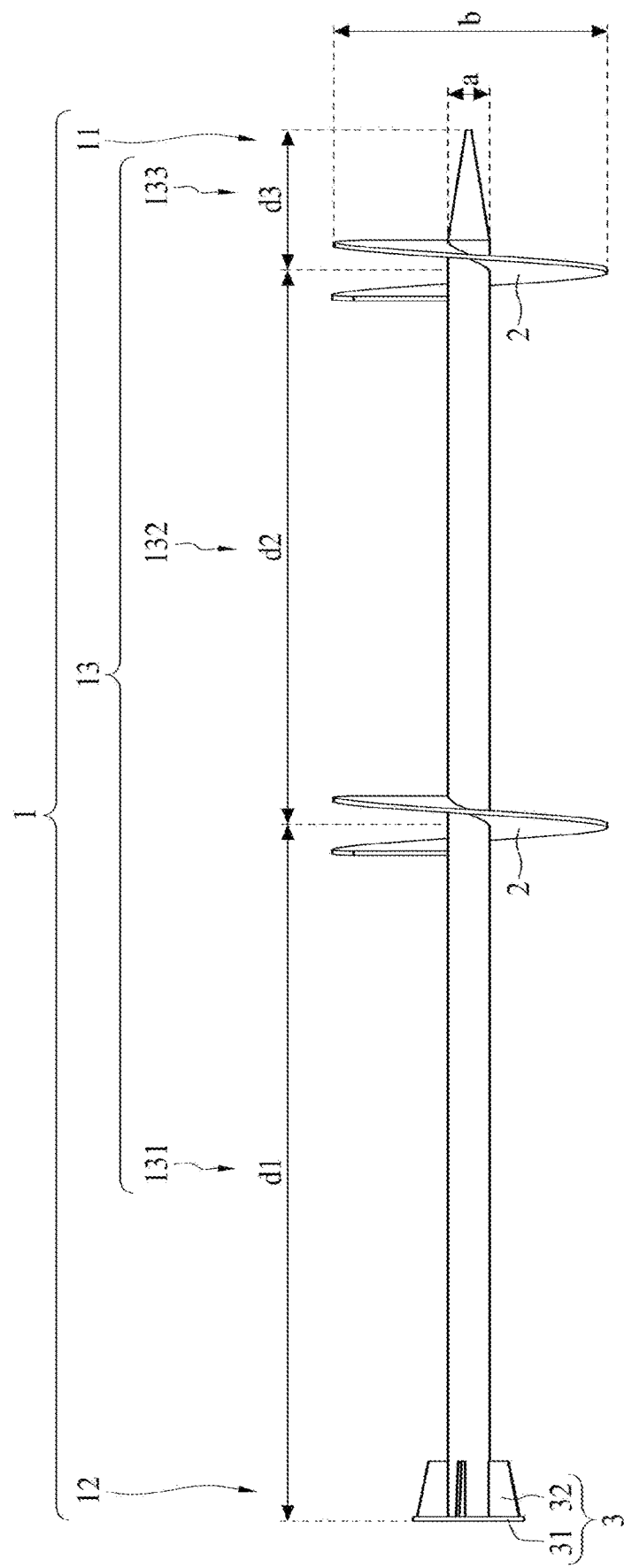
FIG. 4 is an orthographic side view of a helical pile according to a second embodiment of the present disclosure.
Figure 5:
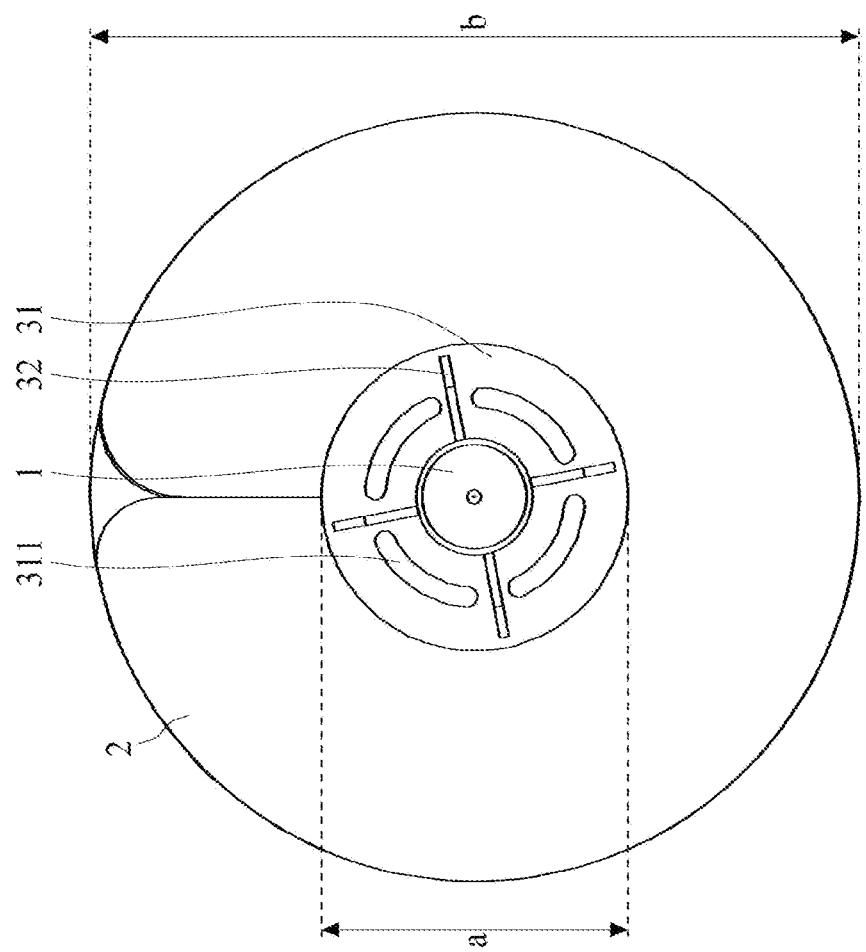
FIG. 5 is an orthographic back view of the helical pile according to the second embodiment of the present disclosure.

Reference is made to FIG. 4 and FIG. 5. FIG. 4 is an orthographic side view of a helical pile according to a second embodiment of the present disclosure, and FIG. 5 is an orthographic back view of the helical pile according to the second embodiment of the present disclosure. The helical pile P2 of the second embodiment includes a column body 1, two helical blades 2 and a loading member 3. The loading member 3 is connected to the loading end 12 of the column body 1 and includes a flange 31 and a plurality of reinforcing ribs 32.

In the second embodiment, the two helical blades 2 have the same blade diameter b, wherein the blade diameter b is preferably 500 mm. The body diameter a of the column body 1 is preferably 76 mm. Therefore, the ratio of a:b is preferably 1:6.58. In fact, in the present disclosure, when the helical pile P includes two helical blades 2, the two helical blades 2 may divide the body section 13 into a first section 131, a second section 132 and a third section 133 between the loading end 12 and the fixing end 11, in which the first section 131 preferably has a length ranging from 1000 to 2000 mm, the second section 132 preferably has a length ranging from 3500 to 4500 mm, and the third section 133 preferably has a length ranging from 300 to 800 mm.

It should be noted that in the embodiments of the present disclosure, the total length of the column body 1 may be from 2 to 9 meters. Specifically, the total length of the column body 1 may be 2, 3, 6 or 9 meters. In the preferred embodiment, the total length of the column body 1 may be about 6 meters. In addition, in the embodiments including two helical blades 2 on the body section 13 of the column body 1, the ratio of the lengths of the first section 131, the second section 132, and the third section 133, d1:d2:d3, may be 5~15:40~60:1, wherein, preferably, d1:d2:d3 is about 10:49:1. For example, in a helical pile P having a column body 1 with a total length of about 6 meters, d1:d2:d3 may be 10:49:1.

In fact, the determination of the size-ratio among the lengths of each section in the body section 13 may follow the principle below: when the helical pile P is fixed in the ground, the helical blade 2 closest to the loading end 12 should have a height of at least 1 meter above the ground, and the helical blade 2 closest to the fixing end 11 should have a distance of at least 100 millimeters away from the very end of the fixing end 11. However, the present disclosure is not limited thereto.

In the second embodiment, the length d1 of the first section 131 is preferably 1300 mm, the length d2 of the second section 132 is preferably 1000 mm, and the length d3 of the third section 133 is preferably 200 mm. Therefore, the total length of the column body 1 is preferably 2500 mm (2.5 m). In addition, each helical blade 2 preferably has a helical structure surrounding the column body of 1 to 1.5 turns, the thickness of each helical blade 2 is preferably 8 mm, and the helical structure of each helical blade 2 preferably extends 108 mm along the axial direction of the column body 1.

In the second embodiment, the flange 31 preferably has a diameter of 200 mm and a thickness of 8 mm. As shown in FIG. 5, the loading member 3 further has four reinforcing ribs 32 disposed around the column body 1, and these reinforcing ribs 32 each have two side surfaces preferably formed in the shape of a trapezoid. The two side surfaces preferably have a spacing of 6 mm therebetween. Specifically, in the second embodiment, the long edge of each trapezoidal side surface is preferably 55.5 mm, the short edge thereof is preferably 35 mm, and the height thereof is preferably 100 mm.

In addition, as shown in FIG. 5, the flange 31 of the loading member 3 further includes four openings 311. The four openings 311 are arranged around the column body 1 and are spaced between the four reinforcing ribs 32. Each of the four openings 311 is a narrow arc-shaped slot, and the imaginary circle formed by the four openings 311 together preferably has a diameter of 130 mm. The radian measure of the arc of each opening 311 with respect to the axis of the column body 1 is preferably 60°.

In the second embodiment, the helical pile P2 may be covered by a multi-functional coating having a thickness of preferably 300 µm or more, and the multi-functional coating may be an epoxy coating. The epoxy coating may be formed by a thermal setting fusion binding powder using epoxy resin as the main film-forming material.

Third Embodiment

Figure 6:
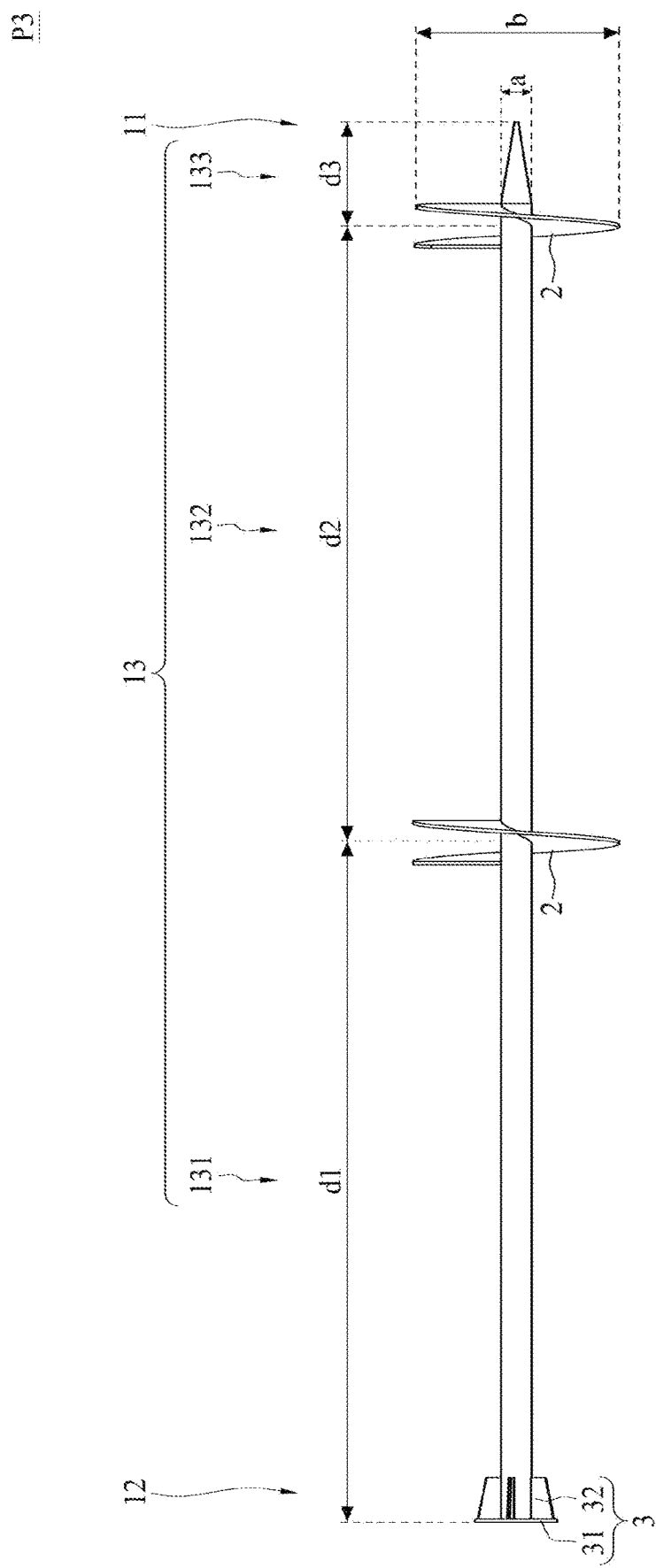
FIG. 6 is an orthographic side view of a helical pile according to a third embodiment of the present disclosure.

Reference is made to FIG. 6. FIG. 6 is an orthographic side view of a helical pile according to a third embodiment of the present disclosure. The difference between the third embodiment and the second embodiment is that the lengths of the column body 1 of the helical piles P2, P3 are different.

The helical pile P3 of the third embodiment includes a column body 1, two helical blades 2 and a loading member 3. Similar to the second embodiment, in the third embodiment, the loading member 3 is connected to the loading end 12 of the column body 1 and includes a flange 31 and a plurality of reinforcing ribs 32. In the third embodiment, the two helical blades 2 preferably have the same blade diameter b, which is preferably 500 mm. The body diameter a of the column body 1 is preferably 76 mm. Therefore, the a:b ratio is preferably 1:6.58.

In the third embodiment, the length d1 of the first section 131 is preferably 1700 mm, the length d2 of the second section 132 is preferably 1500 mm, and the length d3 of the third section 133 is preferably 200 mm. Therefore, the total length of the column body 1 is preferably 3400 mm (3.4 m). In addition, each of the helical blades 2 has a helical structure surrounding the column body 1 for 1.5 turns, the thickness of each helical blade 2 is 8 mm, and the helical structure of each helical blade 2 preferably extends 108 mm along the axial direction of the column body 1.

In the third embodiment, the flange 31 preferably has a diameter of 200 mm and a thickness of 8 mm. The details regarding the reinforcing ribs 32 and the openings 311 are the same as those described in the second embodiment.

In the third embodiment, the helical pile P3 may be covered by a multi-functional coating having a thickness of preferably 85 μm or more, and the multi-functional coating may be a hot-dip galvanized coating.

Fourth Embodiment

Figure 7:
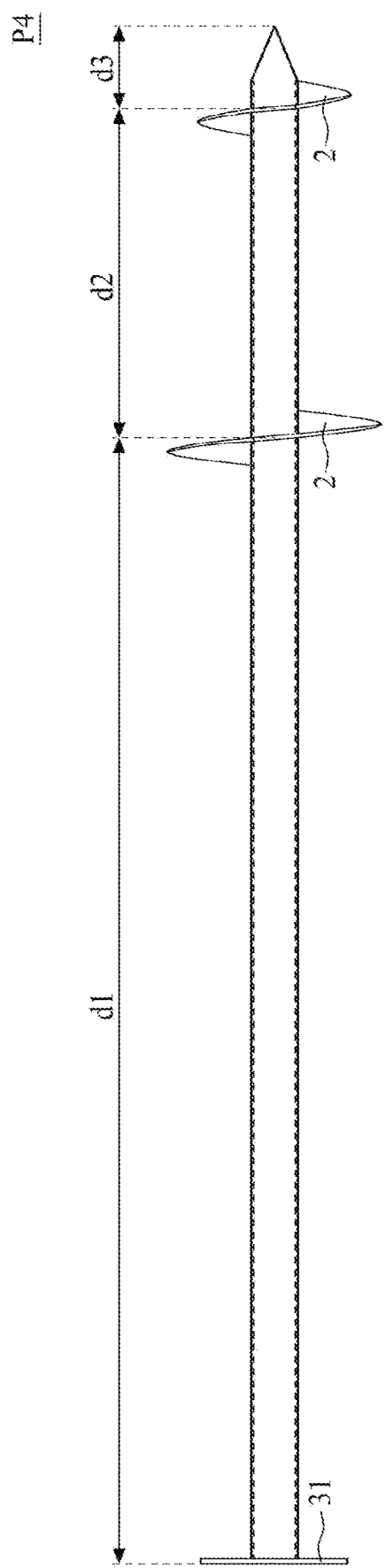
FIG. 7 is an orthographic side view of a helical pile according to a fourth embodiment of the present disclosure.

Reference is made to FIG. 7. FIG. 7 is an orthographic side view of the helical pile P4 according to a fourth embodiment of the present disclosure. Similar to the second and third embodiments, the helical pile P4 of the fourth embodiment includes two helical blades 2. The difference between the second, the third embodiments and the fourth embodiment is that the diameters of the two helical blades 2 are different in the fourth embodiment.

Specifically, in the fourth embodiment, the helical blade 2 closer to the fixing end 11 has a diameter of preferably 250 mm, and the other helical blade 2 has a diameter of preferably 350 mm. The body diameter a of the helical pile P4 is preferably 76.4 mm. Therefore, in the helical pile P4, the ratio of the body diameter a to the diameter b of the smaller helical blade 2 is preferably 1:3.27.

In the fourth embodiment, the length d1 of the first section 131 is preferably 2050 mm, the length d2 of the second section 132 is preferably 600 mm, and the length d3 of the third section 133 is preferably 150 mm. Therefore, the total length of the column body 1 is preferably 2800 mm (2.8 m). In addition, each of the helical blades 2 has a helical structure surrounding the column body 1 for 1 turn; and the helical structure of each helical blade 2 preferably extends for 100 mm along the axial direction of the column body 1.

Further, different from the previous embodiments, the loading member 3 of the helical pile P4 in the fourth embodiment has no reinforcing ribs.

Fifth Embodiment

Figure 8:
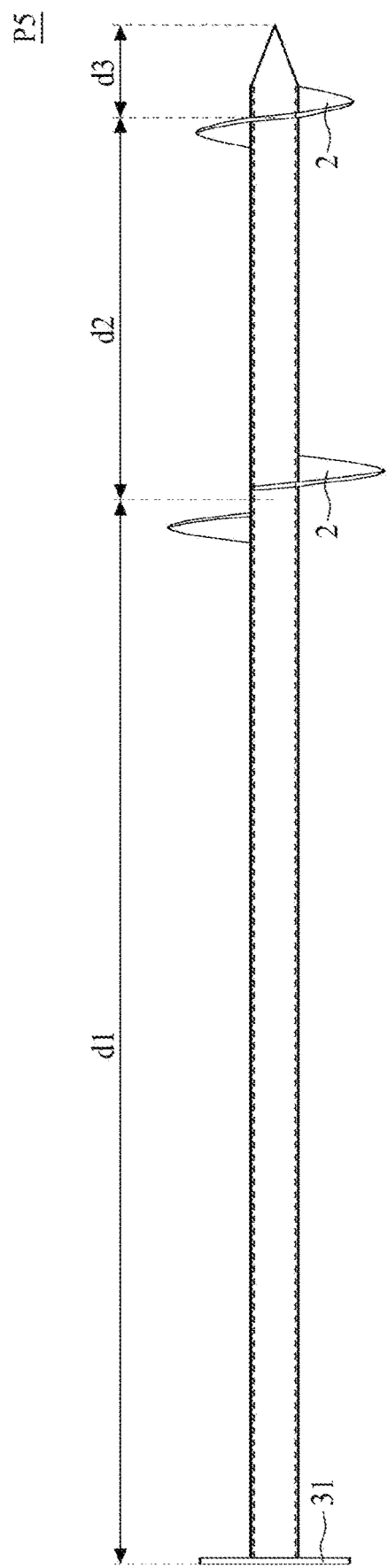
FIG. 8 is an orthographic side view of a helical pile according to a fifth embodiment of the present disclosure.

Reference is made to FIG. 8. FIG. 8 is an orthographic side view of the helical pile P5 according to a fifth embodiment of the present disclosure. The difference between the fourth embodiment shown in FIG. 7 and the fifth embodiment shown in FIG. 8 is that the total length of the helical pile P5 in the fifth embodiment is preferably 2500 mm.

Specifically, similar to the fourth embodiment, in the fifth embodiment, the helical blade 2 closer to the fixing end 11 has a diameter of preferably 250 mm, and the other helical blade 2 has a diameter of preferably 350 mm. The body diameter a of the helical pile P5 is preferably 76.4 mm. Therefore, in the helical pile P5, the ratio of the body diameter a to the blade diameter b of the smaller helical blade 2 is preferably 1:3.27. In addition, each of the helical blades 2 has a helical structure surrounding the column body 1 for 1 turn. However, in the fifth embodiment, the length d1 of the first section 131 is preferably 1750 mm, the length d2 of the second section 132 is preferably 600 mm, and the length d3 of the third section 133 is preferably 150 mm. Therefore, the total length of the column body 1 is preferably 2500 mm (2.5 m).

Sixth Embodiment

Figure 9:
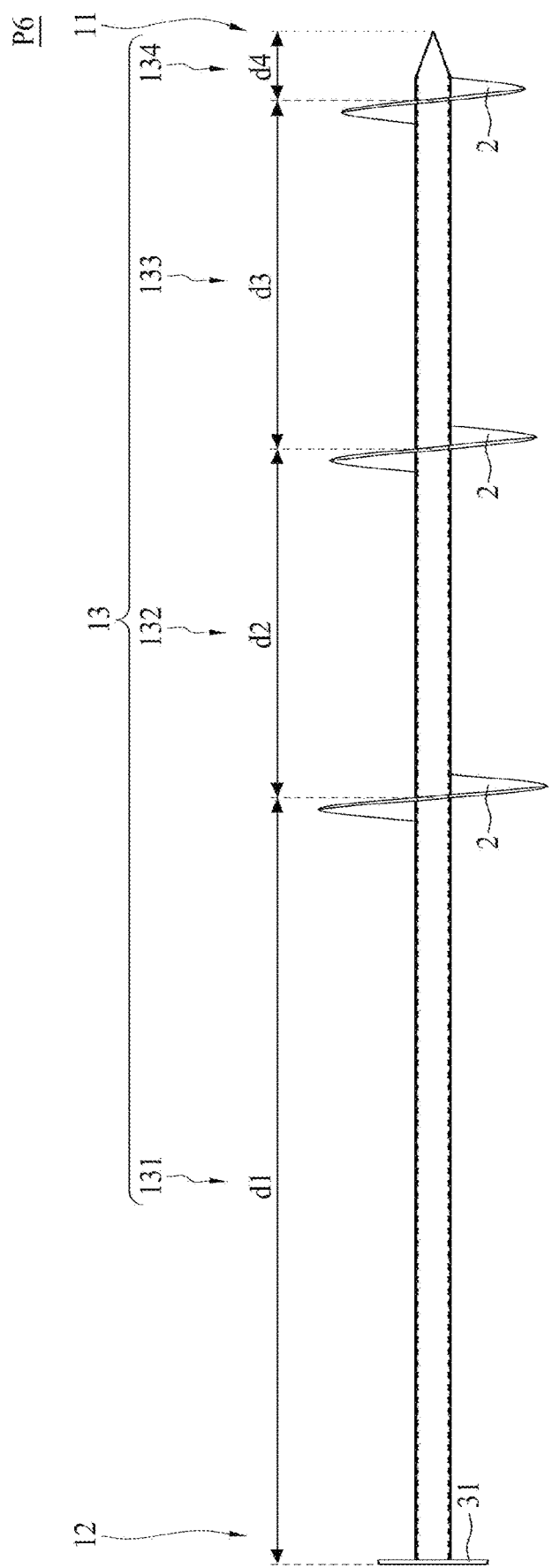
FIG. 9 is an orthographic side view of a helical pile according to a sixth embodiment of the present disclosure.

Reference is made to FIG. 9. FIG. 9 is an orthographic side view of the helical pile P6 according to a sixth embodiment of the present disclosure. The helical pile P6 of the sixth embodiment includes three helical blades 2.

In the sixth embodiment, the three helical blades 2 have diameters of preferably 400 mm, 450 mm and 500 mm, starting from the helical blade 2 closest to the fixing end 11. The body diameter a of the helical pile P6 is preferably 76.4 mm. Therefore, in the helical pile P6, the ratio of the body diameter a to the blade diameter b of the smallest helical blade 2 is preferably 1:5.24.

In the sixth embodiment, the three helical blades 2 divide the body section 13 of the helical pile P6 into a first section 131, a second section 132, a third section 133 and a fourth section 134. The length d1 of the first section 131 is preferably 1650 mm, the length d2 of the second section 132 is preferably 750 mm, the length d3 of the third section 133 is preferably 750 mm, and the length d4 of the fourth section 134 is preferably 150 mm. Therefore, the total length of the column body 1 is preferably 3300 mm (3.3 m). In addition, each of the helical blades 2 has a helical structure surrounding the column body 1 for 1 turn, and the helical structure of each helical blade 2 preferably extends for 100 mm along the axial direction of the column body 1.

Seventh Embodiment

Figure 10:
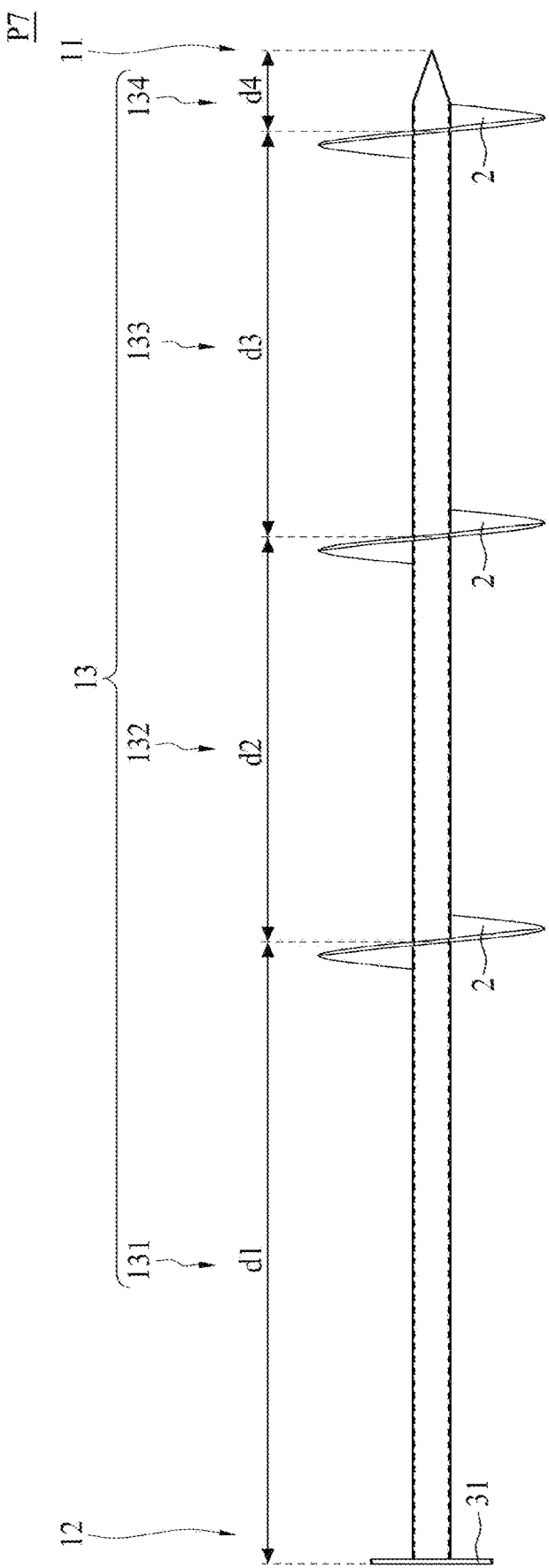
FIG. 10 is an orthographic side view of a helical pile according to a seventh embodiment of the present disclosure.

Reference is made to FIG. 10. FIG. 10 is an orthographic side view of the helical pile P7 according to a seventh embodiment of the present disclosure. The difference between the sixth embodiment shown in FIG. 9 and the seventh embodiment shown in FIG. 10 is that the total length of the column body 1 of the helical pile P7 and the dimensions of the helical blades 2 in the seventh embodiment differ from those of the helical pile P6.

In the seventh embodiment, each of the three helical blades 2 has a blade diameter b of preferably 450 mm. The body diameter a of the helical pile P7 is preferably 76.4 mm. Therefore, in the helical pile P7, the ratio of the body diameter a to the blade diameter b is preferably 1:5.89.

In the seventh embodiment, the three helical blades 2 divide the body section 13 of the helical pile P7 into a first section 131, a second section 132, a third section 133 and a fourth section 134. The length d1 of the first section 131 is preferably 1150 mm, the length d2 of the second section 132 is preferably 750 mm, the length d3 of the third section 133 is preferably 750 mm, and the length d4 of the fourth section 134 is preferably 150 mm. Therefore, the total length of the column body 1 is preferably 2800 mm (2.8 m). In addition, each helical blade 2 has a helical structure surrounding the column body 1 for 1 turn; and the helical structure of each helical blade 2 preferably extends for 100 mm along the axial direction of the column body 1.

Eighth Embodiment

Figure 11:
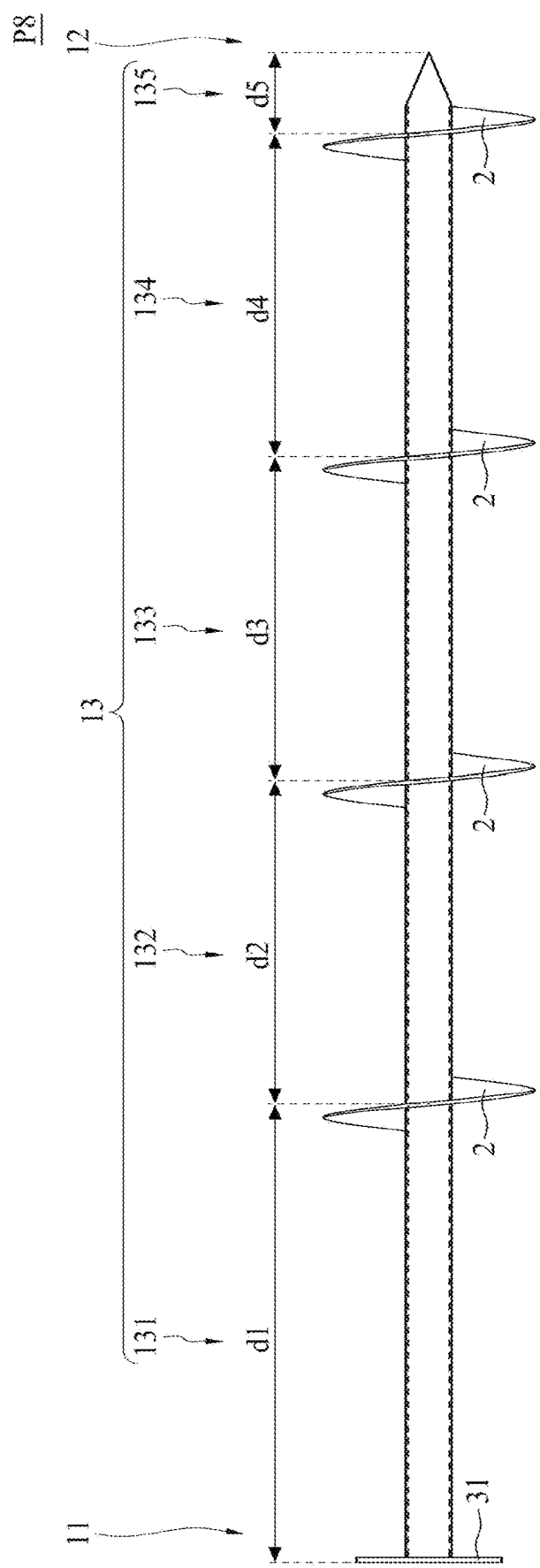
FIG. 11 is an orthographic side view of a helical pile according to an eighth embodiment of the present disclosure.

Reference is made to FIG. 11. FIG. 11 is an orthographic side view of the helical pile P8 according to an eighth embodiment of the present disclosure. The helical pile P8 of the eighth embodiment has four helical blades 2.

In the eighth embodiment, each of the four helical blades 2 preferably has a blade diameter b of 350 mm. The body diameter a of the helical pile P8 is preferably 76.4 mm. Therefore, in the helical pile P8, the ratio of the body diameter a to the blade diameter b is preferably 1:4.58.

In the eighth embodiment, the four helical blades 2 divide the body section 13 of the helical pile P8 into a first section 131, a second section 132, a third section 133, a fourth section 134 and a fifth section 135. The length d1 of the first section 131 is preferably 850 mm, the length d2 of the second section 132 is preferably 600 mm, the length d3 of the third section 133 is preferably 600 mm, the length d4 of the fourth section 134 is preferably 600 mm, and the length d5 of the fifth section 135 is preferably 150 mm. Therefore, the total length of the column body 1 is preferably 2800 mm (2.8 m). In addition, each helical blade 2 has a helical structure surrounding the column body 1 for 1 turn, and the helical structure of each helical blade 2 preferably extends for 100 mm along the axial direction of the column body 1.

Nineth Embodiment

Figure 12:
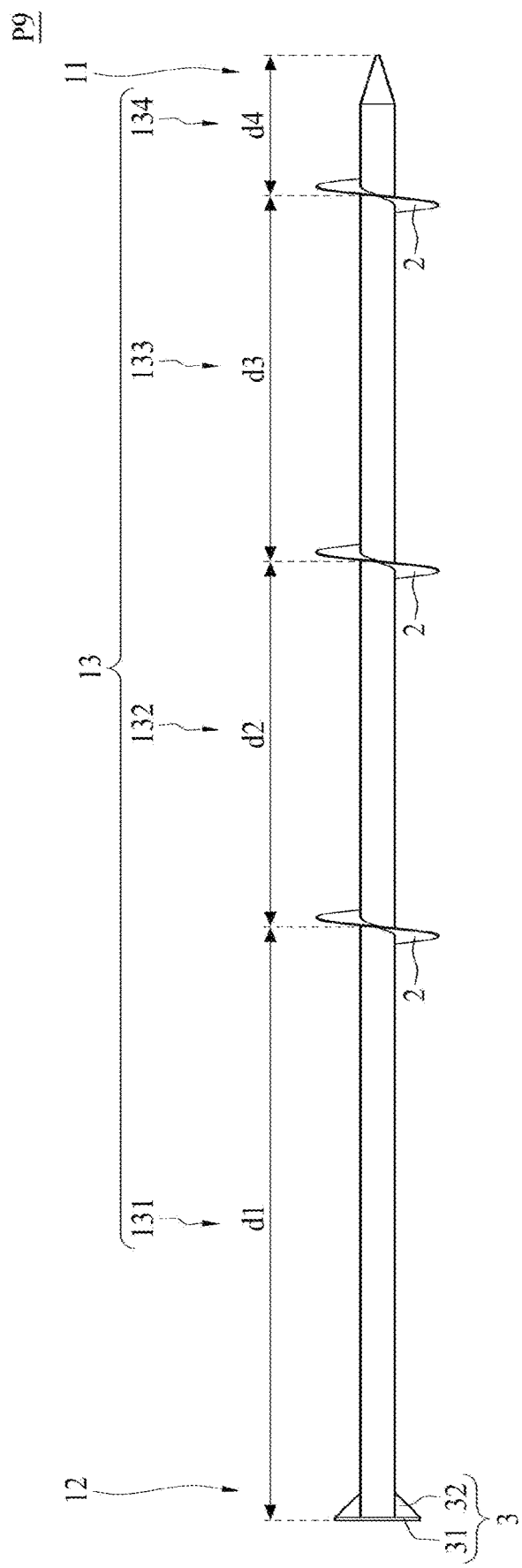
FIG. 12 is an orthographic side view of a helical pile according to a ninth embodiment of the present disclosure.

Reference is made to FIG. 12. FIG. 12 is an orthographic side view of a helical pile P9 according to a ninth embodiment of the present disclosure. The helical pile P9 of the ninth embodiment includes three helical blades 2. Further, the loading member 3 of the helical pile P9 of the ninth embodiment includes a flange 31 and a plurality of reinforcing ribs 32, wherein each of the side surfaces of the reinforcing ribs 32 is preferably triangular. Each of the three helical blades 2 preferably has a diameter of 500 mm. In addition, the body diameter a of the column body 1 of the helical pile P9 is preferably 140 mm, and, therefore, in the ninth embodiment, the ratio of the body diameter a to the blade diameter b is preferably about 1:3.57.

In the ninth embodiment, the three helical blades 2 divide the body section 13 of the helical pile P9 into a first section 131, a second section 132, a third section 133 and a fourth section 134. The length d1 of the first section 131 is preferably 2500 mm, the length d2 of the second section 132 is preferably 1500 mm, the length d3 of the third section 133 is preferably 1500 mm, and the length d4 of the fourth section 134 is preferably 500 mm. Therefore, the total length of the column body 1 is preferably 6000 mm (6 m). In addition, each helical blade 2 has a helical structure surrounding the column body 1 for 1 turn.

When the helical pile P9 of the ninth embodiment is fixed into the ground, the length of the helical pile P9 below the surface is preferably 5500 mm (5.5 m).

The compression bearing capacity ($Q_a$) and the uplift bearing capacity ($R_a$) of the helical pile P9 exemplified in the ninth embodiment are calculated according to equations 1 and 2 mentioned above. The dimensions and the calculated parameters of the helical pile P9 are listed in the following Table 3.

TABLE 3

| Item | Resulting value | Unit |
| --- | --- | --- |
| Body diameter a | 0.14 | m |
| Blade diameter b | 0.50 | m |
| Projected area of the helical blade (Ad) | 0.18 | m² |
| Spacing of the helical blades (S) | 3.0 | m |
| Circumference of the helical pile ($\mu 1$) | 0.44 | m |

TABLE 3-continued

| Item | Resulting value | Unit |
| --- | --- | --- |
| Circumference of the helical blade ($\mu 2$) | 1.57 | m |
| Depth in the ground above the helical blade closest to the loading end | 1.90 | m |
| Average N value of the soil above the helical blade closest to the loading end (N1) | 5.00 | |
| Average N value of the soil between the helical blades (N2) | 10.00 | |
| Average N value of the soil under the helical blade closest to the fixing end (N3) | 10.00 | |
| Average side resistance force of the soil above the helical blade closest to the loading end (fs1) | 16.67 | Kpa |
| Average side resistance force of the soil between the helical blades (fs2) | 33.33 | Kpa |
| Ultimate point resistance at the fixing end of the helical pile (qb) | 300.00 | Kpa |
| Ultimate compression bearing capacity (Quk) | 221.63 | KN |
| Ultimate uplift bearing capacity (Quk) | 189.86 | KN |
| Compression bearing capacity ($Q_a$) | 73.88 | KN |
| uplift bearing capacity ($R_a$) | 63.29 | KN |
| Total length of the helical pile | 5.50 | m |

Based on Table 3, the helical pile P9 of the ninth embodiment has a compression bearing capacity of 73.88 KN and an uplift bearing capacity of 63.29 KN. In other words, the helical pile P9 possesses excellent strength performance.

Figure 13:
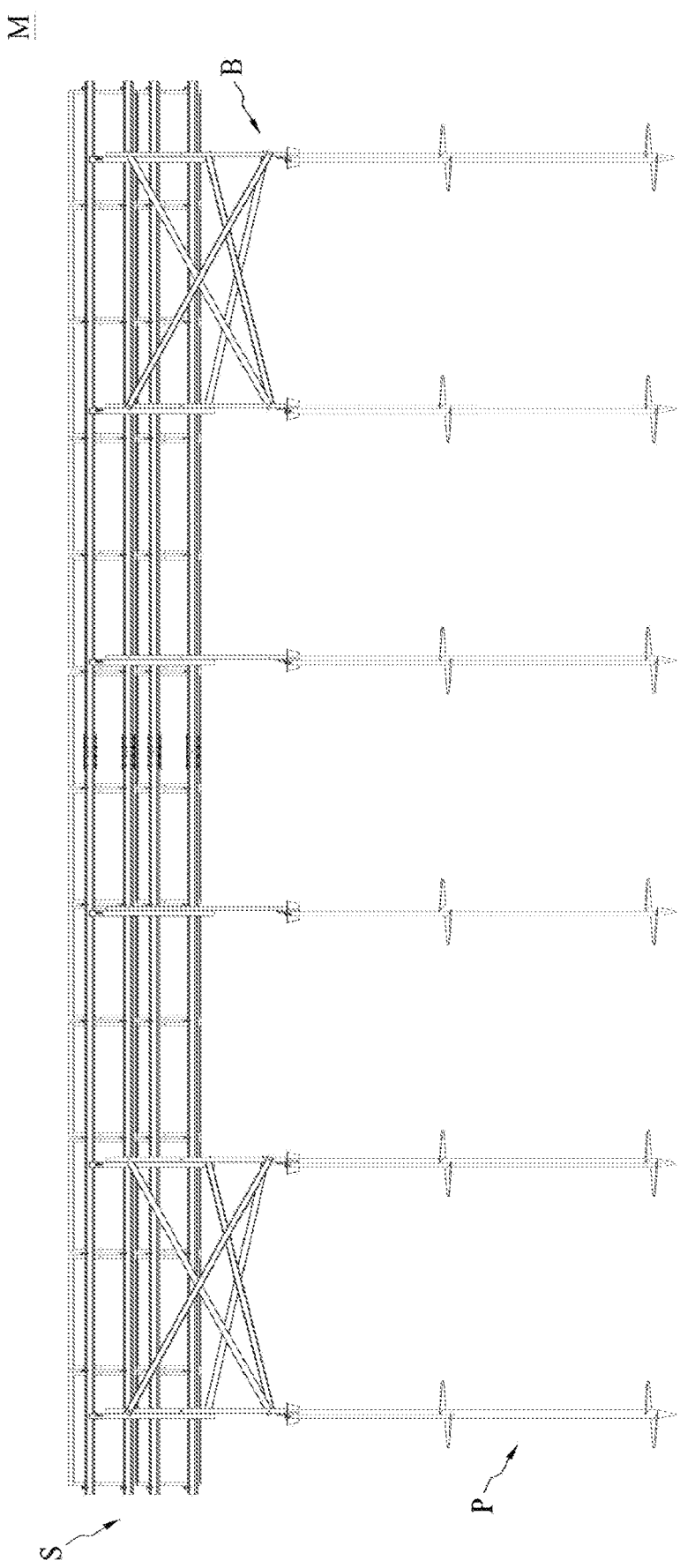
FIG. 13 is an orthographic front view of a bracket module provided by an embodiment of the present disclosure.
Figure 14:
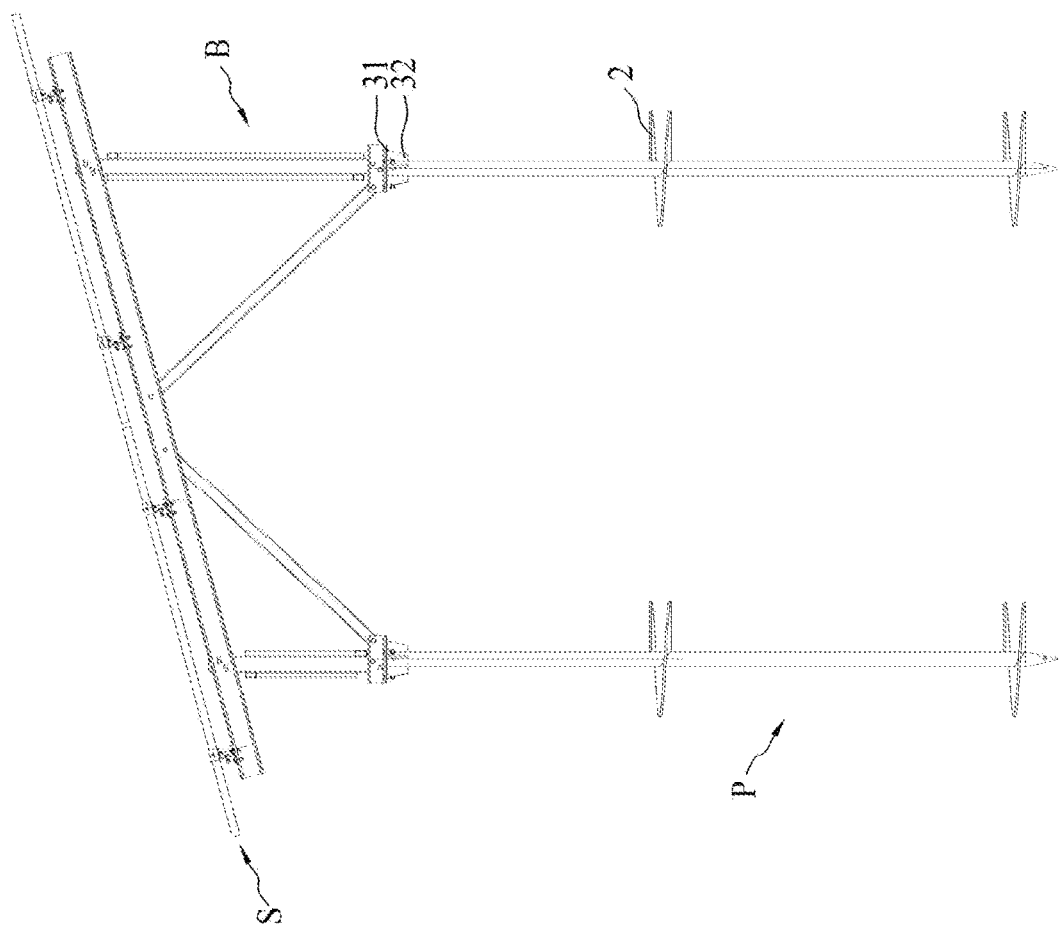
FIG. 14 is an orthographic side view of the bracket module provided by the embodiment of the present disclosure.

Furthermore, the present disclosure provides a bracket module. Reference is made to FIG. 13 and FIG. 14. FIG. 13 is an orthographic front view of a bracket module provided by an embodiment of the present disclosure, and FIG. 14 is an orthographic side view of the bracket module provided by the embodiment of the present disclosure.

As shown in FIG. 13 and FIG. 14, the bracket module M provided by the embodiments of the present disclosure includes helical piles P and a connecting frame B, wherein the connecting frame B is connected to the helical pile P through the flange 31 of the loading end 12 of the helical piles P by fixing members, such as screws. The connecting frame B is configured to mount a solar cell panel S. In fact, the helical piles P included in the bracket module M may be any of the helical piles P1~P9, such helical piles P including a column body 1, at least a helical blade 2 and a loading member 3 as described above. Therefore, the details of the helical piles P, P1~P9 will not be reiterated herein.

Specifically, as shown in FIG. 14, the helical pile P is connected to the connecting frame B through the flange 31. As mentioned above, the flange 31 of the helical pile P may include a plurality of openings 311 (not shown in FIG. 14) for connecting the helical pile P to the connecting frame B through fixing members, such as screws.

Further, regarding the different conditions of the ground or soil at the installation locations, the helical piles P and the bracket module M including the helical piles P provided by the embodiments of the present disclosure may be installed according to different construction guidelines. As long as a suitable installation process is utilized, the helical piles P and the bracket module M including the helical piles P provided by the embodiments of the present disclosure are applicable to locations with various types of soil ranging from Grade 1 to Grade 7.

TABLE 4

| Soil Grade | Soil property | Soil components | Construction guideline |
|---|---|---|---|
| 1 | Top soil | sand, gravel, sediment | |
| 2 | Liquified soil | Liquids and slurry groundwater | Applicable, but the strength of the soil is insufficient |
| 3 | Loose soil | Loose sand, gravel, or the mixture thereof | Applicable with little resistance |
| 4 | Loose soil with viscosity | Sand, gravel, mud and clay, wherein at least 15% of the soil content is components with particle sizes of less than 0.06 mm; and wherein rocks with a diameter of less than 64 mm (2.5 inches) and a volume of less than 0.01 m³ are less than 30% of the total soil content | Applicable with little resistance |
| 5 | Soil with rocks | The content of rocks with a diameter of larger than 63 mm (2.5 inches) and a volume of 0.01 m³ is larger than 30% | Applicable with large resistance |
| 6 | Movable stony soil | Soil with rocks, connected tightly, fragile, with slate, and weathered | Helical holes must be formed in advance |
| 7 | Movable hard rocks | Small rocks with structural strength, weathered mudstone, slag, iron ore, etc. | Helical holes must be formed in advance |

In summary, one of the major technical features of the present disclosure is that the helical piles P, P1~P9 and the bracket module M including the same provided by the embodiments of the present disclosure are applicable for use at locations with peculiar geologic nature according to the specially-defined size-ratio of the members and components in the structure thereof, for example, "the ratio of the body diameter a of the column body 1 to the blade diameter b of the helical blade 2 is from 1:3 to 1:7", and the feature of the provided multi-functional coatings.

Specifically, the structural design of the helical pile P of the present disclosure includes enlarged helical blade(s) (the helical blades 2 have a blade diameter b relatively larger than the body diameter a of the column body 1) which provide excellent compression bearing capacity and uplift bearing capacity. Therefore, compared to a concrete pile of the existing art, for example, a concrete pile with a length of 18 m, the helical pile P of the present disclosure may only be formed with a comparatively short length of 6 m but achieve equivalent levels of bearing capacity. In addition, the bracket module M may have a plurality of helical piles P with small spacing therebetween, and even though the number of the helical piles P required in a bracket module M is more than the number of the concrete piles required in the existing art, these helical piles P share the load evenly, and therefore, the material (stainless steel) required for making the connecting frame B that attaches to the helical piles P within the bracket module M is reduced significantly, thereby largely reducing the manufacturing cost.

As mentioned above, the bracket module M including the helical piles P may include a plurality of helical piles P with small spacing therebetween, wherein beams may be used to connect between each of the vertical columns in the connecting frame B. As such, construction paths may be easily provided in the bracket module M through these beams during the construction process, thereby reducing the cost for building additional construction paths from scratch, and the construction and installation of the upper connecting frame B and the solar cell panels may be facilitated conveniently and efficiently.

It should be noted that power stations with solar equipment using the bracket module M may be disassembled at the conclusion of the life cycle of the solar equipment (for example, 25 years), at which point the helical piles P adopted in the bracket module M may be pulled-out of the ground by machinery and the material thereof may be recovered and recycled. And the ground of such a location may also be readily returned to its original use. Compared to the concrete piles of the existing art which are difficult to extricate from the ground and are sometimes left behind, the helical piles P of the present disclosure are much more environmentally friendly.

In addition to the selections of the dimensions for the members and the components of the helical pile P, some of the embodiments of the present disclosure further include a multi-functional coating formed by specific manufacturing processes, such as an epoxy coating or a zinc coating, or a composite coating including a multi-coating structure, thereby significantly increasing the durability of the installed helical piles P. Specifically, the helical piles P provided by the embodiments of the present disclosure may endure for the typical life cycle of a solar cell power station, which can be more than 20 years.

The above embodiments were chosen and described in order to explain the principles of the disclosure and their practical application, so as to enable others skilled in the art to utilize the disclosure in various embodiments and with various modifications as are suited to the particular use contemplated. Alternative embodiments will be apparent to those skilled in the art to which the present disclosure pertains without departing from its spirit and scope.

What is claimed is:

1. A helical pile including:
    a column body having a fixing end, a loading end opposite to the fixing end, and a body section between the fixing end and the loading end;
    at least one helical blade disposed on the column body between the fixing end and the loading end; and
    a loading member connected to the loading end of the column body and including a flange, wherein the loading member is fixed to the column body and configured to be connected to a support structure of a solar equipment;
    wherein the ratio of the body diameter of the column body to the blade diameter of the helical blade ranges from 1:3 to 1:7;
    wherein the helical pile further includes a multi-functional coating covering the surface of the column body and the at least one helical blade, in which the multi-functional coating includes an epoxy coating, a zinc-containing coating or a combination thereof, and the epoxy coating has a thickness from 50 to 250 μm and the zinc-containing layer has a thickness from 50 to 350 μm;
    wherein the column body has a cylindrical shape;
    wherein the epoxy coating is formed by a high-performance fusion binding epoxy coating technique or a high-performance non-solvent liquid epoxy coating technique, and is a multi-layered composite structure including a surface sub-layer with anti-aging, anti-wear and marine substances-resistance properties, an intermediate sub-layer with anti-water permeability, and a bottom sub-layer bonded to the surface of the column body; and
    wherein the zinc-containing coating is formed by Volatile corrosion inhibitor (VCI) Superimposed Zinc technique, and includes a first layer comprising volatile slow-release molecules filled within and attached onto a material of the column body and a second layer containing zinc metal disposed on the first layer.

2. The helical pile according to claim 1, wherein the at least one helical blade divides the body section into at least a first section and a second section between the loading end and the fixing end, and the ratio of the length of the first section to the length of the second section ranges from 6:1 to 2:1.

3. The helical pile according to claim 1, wherein the helical pile includes two helical blades which divide the body section into a first section, a second section and a third section between the loading end and the fixing end, and the first section has a length ranging from 1000 to 2000 mm, the second section has a length ranging from 4500 to 5300 mm, and the third section has a length ranging from 50 to 150 mm.

4. The helical pile according to claim 1, wherein the helical pile includes three helical blades which divide the body section into a first section, a second section, a third section and a fourth section between the loading end and the fixing end, and the first section has a length ranging from 1000 to 2000 mm, the second section has a length ranging from 2000 to 3000 mm, the third section has a length ranging from 2000 to 3000 mm, and the fourth section has a length ranging from 50 to 150 mm.

5. The helical pile according to claim 1, wherein the flange has a diameter ranging from 100 to 300 mm and a thickness ranging from 5 to 10 mm, and the flange has a plurality of openings.

6. The helical pile according to claim 1, wherein the loading member further includes a plurality of reinforcing ribs each having two side surfaces with a certain geometrical shape that are separated from each other by 3 to 10 mm; the plurality of reinforcing ribs each being attached to a lower surface of the flange and a body surface of the column body.

7. The helical pile according to claim 1, wherein the at least one helical blade has a diameter ranging from 200 to 500 mm and a helical structure surrounding the column body for 1 to 2 turns.

8. The helical pile according to claim 7, wherein the helical structure extends from 50 to 200 mm along the axial direction of the column body.

9. A bracket module including the helical pile according to claim 1 and a connecting frame, wherein the connecting frame is connected to the helical pile via the flange at the loading end, and the connecting frame is for mounting a solar cell panel thereon.

* * * * *